United States Patent
Westerinen et al.

(10) Patent No.: US 9,430,055 B2
(45) Date of Patent: Aug. 30, 2016

(54) DEPTH OF FIELD CONTROL FOR SEE-THRU DISPLAY

(75) Inventors: Jeff Westerinen, Preston, WA (US); Rod G. Fleck, Bellevue, WA (US); Jack Clevenger, Woodinville, WA (US); Stephen Latta, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 162 days.

(21) Appl. No.: 13/525,111

(22) Filed: Jun. 15, 2012

(65) Prior Publication Data
US 2013/0335404 A1    Dec. 19, 2013

(51) Int. Cl.
| | |
|---|---|
| *G06T 15/00* | (2011.01) |
| *G06F 3/033* | (2013.01) |
| *G09G 5/02* | (2006.01) |
| *G02B 27/00* | (2006.01) |
| *G06T 19/00* | (2011.01) |
| *G02B 27/01* | (2006.01) |
| *G02B 5/30* | (2006.01) |
| *G09G 3/00* | (2006.01) |

(52) U.S. Cl.
CPC ............... *G06F 3/033* (2013.01); *G02B 5/30* (2013.01); *G02B 27/0075* (2013.01); *G02B 27/017* (2013.01); *G02B 27/0172* (2013.01); *G06T 19/006* (2013.01); *G09G 3/003* (2013.01); *G09G 5/02* (2013.01); *G02B 2027/0118* (2013.01); *G02B 2027/0127* (2013.01); *G02B 2027/0138* (2013.01)

(58) Field of Classification Search
CPC ...... H04N 13/0257; H04N 13/0018; H04N 13/0278; H04N 13/0289; H04N 13/0468; H04N 13/0484; G06T 15/00; G06T 15/503; G06T 19/006; G02B 27/017; G02B 27/0172; G02B 2027/0127; G02B 27/0075; G06F 3/013
See application file for complete search history.

(56) References Cited

U.S. PATENT DOCUMENTS

2002/0109701 A1 *  8/2002  Deering ...................... 345/581
2003/0142068 A1 *  7/2003  DeLuca et al. ............... 345/156
2006/0232665 A1 * 10/2006  Schowengerdt et al. ....... 348/51

(Continued)

OTHER PUBLICATIONS

Gibson, et al., "Interactive Rendering with Real-World Illumination", Retrieved at <<http://aig.cs.man.ac.uk/publications/papers/simon/egwr00.pdf>>, Proceedings of the Eurographics Workshop on Rendering Techniques, Jun. 26, 2000, pp. 365-376.

(Continued)

*Primary Examiner* — Kee M Tung
*Assistant Examiner* — Yi Wang
(74) *Attorney, Agent, or Firm* — Micah Goldsmith; Judy Yee; Micky Minhas

(57) ABSTRACT

One embodiment provides a method for controlling a virtual depth of field perceived by a wearer of a see-thru display device. The method includes estimating the ocular depth of field of the wearer and projecting virtual imagery with a specified amount of blur. The amount of blur is determined as a function of the ocular depth of field. Another embodiment provides a method for controlling an ocular depth of field of a wearer of a see-thru display device. This method includes computing a target value for the depth of field and increasing the pixel brightness of the virtual imagery presented to the wearer. The increase in pixel brightness contracts the wearer's pupils and thereby deepens the depth of field to the target value.

18 Claims, 7 Drawing Sheets

(56) References Cited

U.S. PATENT DOCUMENTS

| | | | |
|---|---|---|---|
| 2007/0236485 A1 | 10/2007 | Trepte | |
| 2007/0236800 A1* | 10/2007 | Cakmakci et al. | 359/630 |
| 2008/0296383 A1* | 12/2008 | Gurevich et al. | 235/462.21 |
| 2009/0189974 A1* | 7/2009 | Deering | 348/46 |
| 2011/0018903 A1* | 1/2011 | Lapstun et al. | 345/633 |
| 2011/0018976 A1* | 1/2011 | Park | 348/51 |
| 2011/0066412 A1 | 3/2011 | Van et al. | |
| 2011/0075257 A1* | 3/2011 | Hua et al. | 359/464 |
| 2011/0157550 A1* | 6/2011 | Chen et al. | 351/206 |
| 2012/0274745 A1* | 11/2012 | Russell | 348/46 |
| 2013/0050432 A1* | 2/2013 | Perez et al. | 348/47 |

OTHER PUBLICATIONS

Wong, et al., "Image-Based Rendering with Controllable Illumination", Retrieved at <<http://www.cse.cuhk.edu.hk/~ttwong/papers/lightfld/illumin.pdf>>, Proceedings of the Eurographics Workshop on Rendering Techniques, Jun. 16, 1997, pp. 13-22.

Agusanto, et al., "Photorealistic Rendering for Augmented Reality using Environment Illumination", Retrieved at <<http://ieeexplore.ieee.org/stamp/stamp.jsp?tp=&arnumber=1240704>>, Proceedings of second IEEE and ACM international symposium on mixed and augmented Reality, Oct. 7, 2003, pp. 208-216.

Bimber, et al., "Consistent Illumination within Optical See-Through Augmented Environments", Retrieved at <<http://citeseerx.ist.psu.edu/viewdoc/download?doi=10.1.1.112.2418&rep=rep1&type=pdf>>, Proceedings of the 2nd IEEE/ACM International Symposium on Mixed and Augmented Reality (ISMAR), 2003, pp. 198-207.

Ghosh, et al., "Real Illumination from Virtual Environments", Retrieved at <<http://www.cs.ubc.ca/~ghosh/Publications/EGSR05-Real_Illum.pdf>>, Proceedings of the Eurographics Symposium on Rendering Techniques, Jun. 29, 2005, pp. 243-252.

* cited by examiner

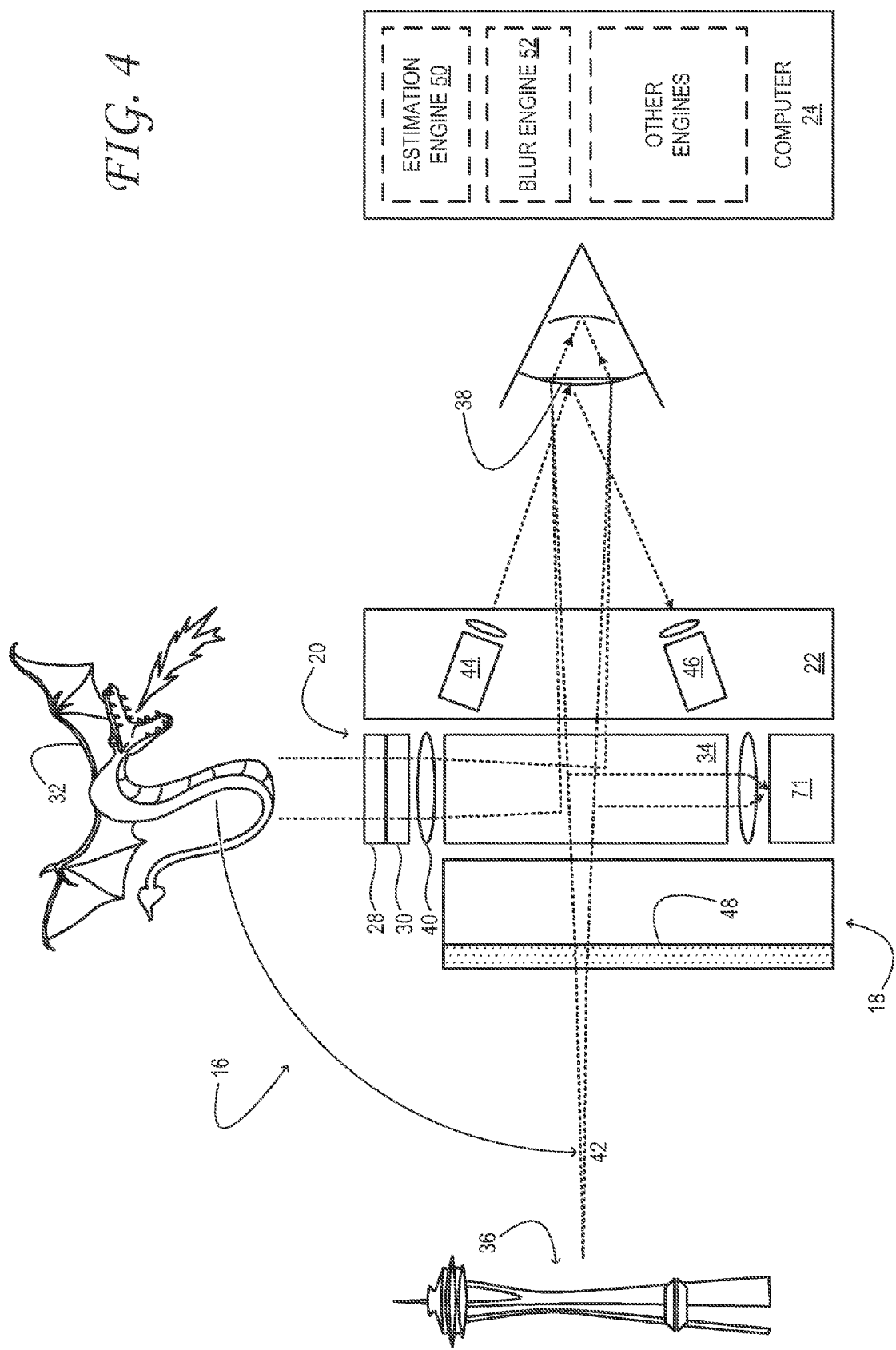

DEPTH OF FIELD CONTROL FOR SEE-THRU DISPLAY

BACKGROUND

An augmented-reality (AR) system enables a person to view real-world imagery together with computer-generated, virtual imagery. The system may include a see-thru display device, which the person wears, and through which the real and virtual imagery are presented. Such a device may be incorporated into goggles, a helmet, glasses, or other eyewear. When configured to present two different virtual images, one for each eye, the see-thru display device may provide a stereoscopic, three-dimensional (3D) display.

In stereoscopic see-thru display applications, merely projecting the desired virtual imagery into the desired focal plane may provide a less-than-realistic AR experience. In particular, the person wearing the see-thru display device may perceive a difference between his or her ocular depth of field, in which real imagery is received, and the apparent depth of field in which the virtual imagery is presented. Inconsistency between the two depths of field can make the virtual imagery look less realistic, and may degrade the wearer's AR experience.

SUMMARY

One embodiment of this disclosure provides a method for controlling a virtual depth of field perceived by a wearer of a see-thru display device. The method includes estimating the ocular depth of field of the wearer and projecting virtual imagery with a specified amount of blur. The amount of blur is determined as a function of the ocular depth of field. Another embodiment provides a method for controlling an ocular depth of field of a wearer of a see-thru display device. This method includes computing a target value for the ocular depth of field and increasing the pixel brightness of the virtual imagery presented to the wearer. The increase in pixel brightness contracts the wearer's pupils and thereby deepens the ocular depth of field to the target value.

This Summary is provided to introduce in simplified form a selection of concepts that are further described in the Detailed Description. This Summary is not intended to identify key features or essential features of the claimed subject matter, nor is it intended to be used to limit the scope of the claimed subject matter. Furthermore, the claimed subject matter is not limited to implementations that solve any disadvantages noted in any part of this disclosure.

BRIEF DESCRIPTION OF THE DRAWINGS

FIG. 4 shows aspects of example optical componentry of a see-thru display device in accordance with an embodiment of this disclosure.

DETAILED DESCRIPTION

Figure 1:
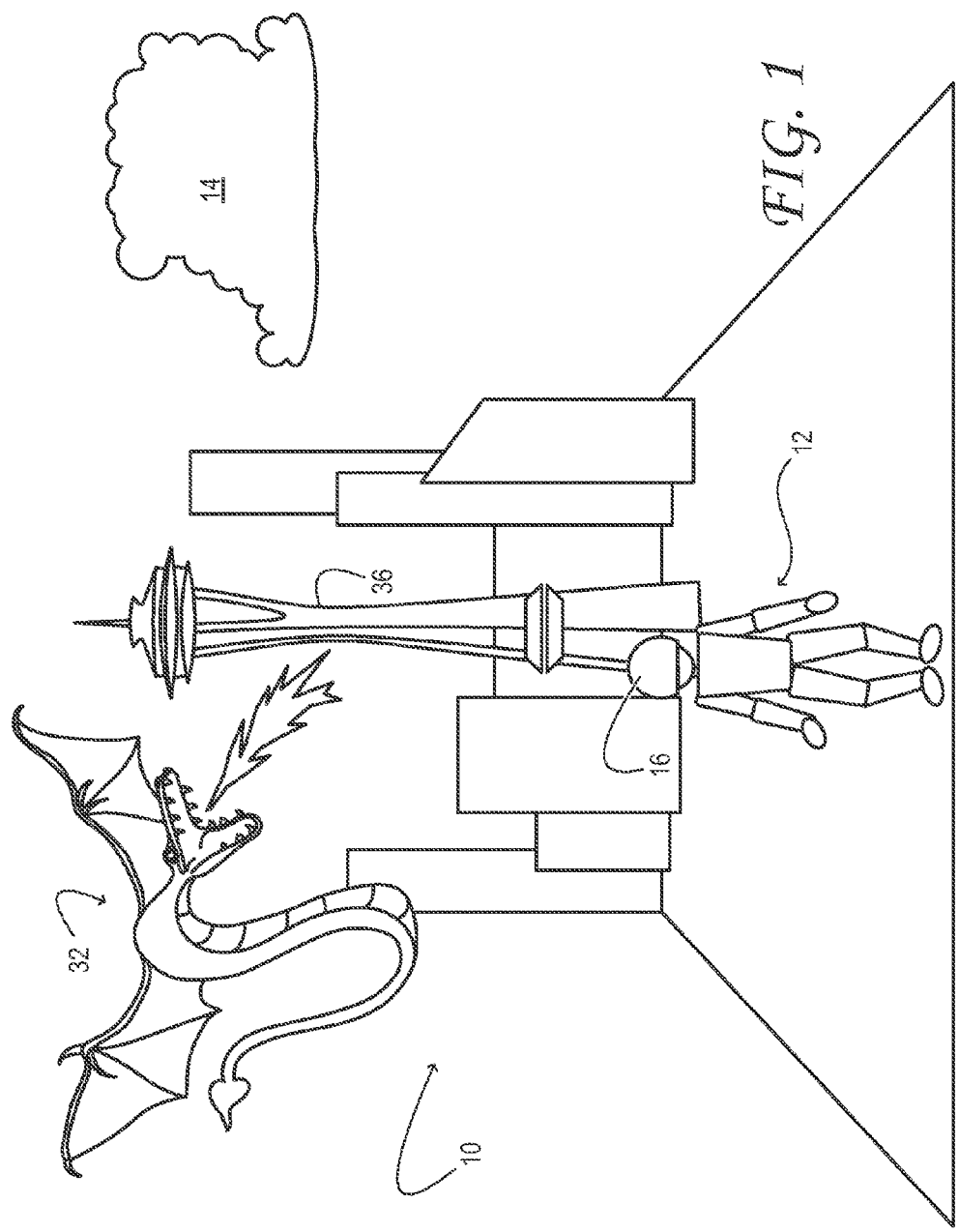
FIG. 1 shows aspects of an augmented-reality environment in accordance with an embodiment of this disclosure.

FIG. 1 shows aspects of an example augmented-reality (AR) environment 10. In particular, it shows AR participant 12 interacting with various real and virtual objects in an exterior space. In other scenarios, the AR environment may include additional AR participants or an interior space. To experience an augmented reality, the AR participant may employ an AR system having suitable display, sensory, and computing hardware. In the embodiment shown in FIG. 1, the AR system includes cloud 14 and see-thru display device 16. 'Cloud' is a term used to describe a computer system accessible via a network and configured to provide a computing service. In the present context, the cloud may include any number of computers.

See-thru display device 16 is a wearable device configured to present real and virtual imagery to its wearer. More specifically, the see-thru display device enables its wearer to view real-world imagery in combination with computer-generated, virtual imagery. Imagery from both sources is presented in the wearer's field of view, and may appear to share the same physical space. As described below in further detail, the see-thru display device may include a computer. Accordingly, some of the computer programs furnishing the AR environment may be executed within the see-thru display device. Others may be executed within cloud 14, which is operatively coupled to the see-thru display device via one or more wired or wireless communication links. Such links may include cellular, Wi-Fi, and others.

In some scenarios, the computer programs furnishing the AR experience may include a game. More generally, the programs may be any that combine computer-generated imagery with the real-world imagery. A realistic AR experience may be achieved with each AR participant viewing his environment naturally, through passive optics of the see-thru display device. The computer-generated imagery, meanwhile, is projected into the same field of view in which the real-world imagery is received.

Figure 2:
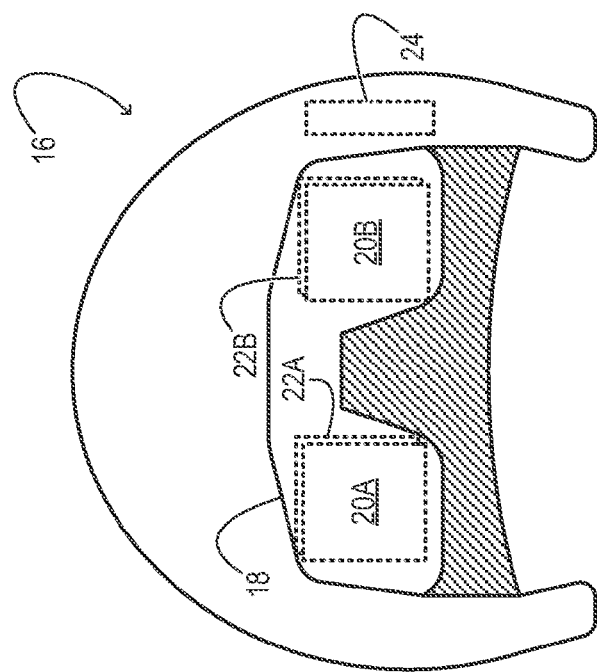

FIG. 2 shows an example see-thru display device 16 in one embodiment. See-thru display device 16 is a helmet having a dimming filter 18 in the form of a visor. The dimming filter may be configured for glare reduction and/or brightness reduction of the real imagery received through the see-thru display device. Between the dimming filter and each of the wearer's eyes is arranged a projector 20 and an eye tracker 22: projector 20A and eye tracker 22A are arranged in front of the right eye; projector 20B and eye tracker 22B are arranged in front of the left eye. Although the eye trackers are arranged behind the projectors in the drawing, they may instead be arranged in front of the projectors, or distributed in various locations within the see-thru display device. See-thru display device 16 also includes computer 24. The computer is operatively coupled to both projectors and to both eye trackers.

Each projector 20 may be at least partly transparent, providing a substantially unobstructed field of view in which the wearer can directly observe his physical surroundings. Each projector is configured to present, in the same field of view, a computer-generated display image. Computer 24 controls the internal componentry of projectors 20A and 20B in order to form the desired display images. In one embodiment, computer 24 may cause projectors 20A and 20B to display the same image concurrently, so that the wearer's right and left eyes receive the same image at the same time. In another embodiment, the projectors may project slightly different images concurrently, so that the wearer perceives a stereoscopic, i.e., three-dimensional image. In one scenario, the computer-generated display image and various real images of objects sighted through the projector may occupy different focal planes. Accordingly, the wearer observing a real-world object may have to shift his corneal focus in order to resolve the display image. In other scenarios, the display image and at least one real image may share a common focal plane.

Each eye tracker 22 is a detector configured to detect an ocular state of the wearer of see-thru display device. The eye tracker may determine a position of a pupil of the wearer's eye, locate a line of sight of the wearer and/or measure an extent of iris closure. If two substantially equivalent eye trackers are included, one for each eye, they may be used together to determine the focal plane of the wearer based on the point of convergence of the lines of sight of the wearer's left and right eyes. This information may be used for placement of one or more virtual images, for example.

Figure 3:
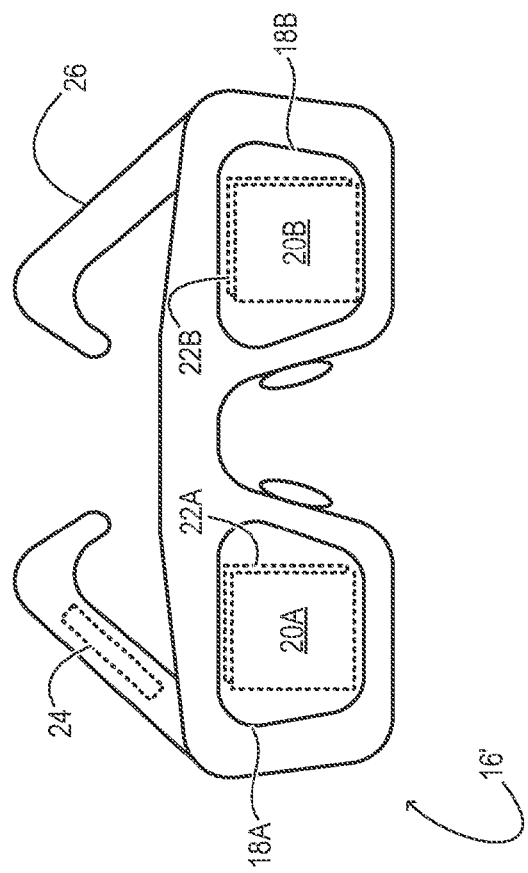
FIGS. 2 and 3 show example see-thru display devices in accordance with embodiments of this disclosure.

FIG. 3 shows another example see-thru display device 16'. See-thru display device 16' is an example of AR eyewear. It may closely resemble an ordinary pair of eyeglasses or sunglasses, but it too includes projectors 20A and 20B, and eye trackers 22A and 22B, which are arranged behind dimming filters 18A and 18B. See-thru display device 16' includes wearable mount 26, which positions the projectors and eye trackers a short distance in front of the wearer's eyes. In the embodiment of FIG. 3, the wearable mount takes the form of conventional eyeglass frames.

No aspect of FIG. 2 or 3 is intended to be limiting in any sense, for numerous variants are contemplated as well. In some embodiments, for example, a binocular projector extending over both eyes may be used instead of the monocular projectors shown in the drawings. Likewise, a see-thru display device may include a binocular eye tracker. In some embodiments, an eye tracker and projector may be integrated together, and may share one or more components.

The see-through display devices of FIGS. 2 and 3 include near-eye display componentry—i.e., componentry situated a short distance in front of the wearer's eyes when the device is worn. This aspect is not meant to be limiting in any sense, for the present disclosure is equally consistent with a wide range of other see-thru display configurations. Such configurations include head-up displays (HUDs) and transparent or partially transparent display screens in laptop, tablet, or handheld computers—e.g., smart phones.

FIG. 4 shows aspects of example optical componentry of see-thru display device 16. In the illustrated embodiment, projector 20 includes illuminator 28 and image former 30. The illuminator may comprise a white-light source, such as a white light-emitting diode (LED). The illuminator may further comprise an optic suitable for collimating the emission of the white-light source and directing the emission into the image former. The image former may comprise a rectangular array of light valves, such as a liquid-crystal display (LCD) array. The light valves of the array may be arranged to spatially vary and temporally modulate the amount of collimated light transmitted therethrough, so as to form pixels of a display image 32. Further, the image former may comprise suitable light-filtering elements in registry with the light valves so that the display image formed is a color image. The display image 32 may be supplied to projector 20 as any suitable data structure—a digital-image or digital-video data structure, for example.

In another embodiment, illuminator 28 may comprise one or more modulated lasers, and image former 30 may be a moving optic configured to raster the emission of the lasers in synchronicity with the modulation to form display image 32. In yet another embodiment, image former 30 may comprise a rectangular array of modulated color LEDs arranged to form the display image. As each color LED array emits its own light, illuminator 28 may be omitted from this embodiment. The various active components of projector 20, including image former 30, are operatively coupled to computer 24. In particular, the computer provides suitable control signals that, when received by the image former, cause the desired display image to be formed.

Continuing in FIG. 4, projector 20 includes multipath optic 34. The multipath optic is suitably transparent, allowing external imagery—e.g., a real image 36 of a real object—to be sighted directly through it. Image former 30 is arranged to project display image 32 into the multipath optic. The multipath optic is configured to reflect the display image to pupil 38 of the wearer of see-thru display device 16. To reflect the display image as well as transmit the real image to pupil 38, multipath optic 34 may comprise a partly reflective, partly transmissive structure.

In some embodiments, multipath optic 34 may be configured with optical power. It may be used to guide display image 32 to pupil 38 at a controlled vergence, such that the display image is provided as a virtual image in the desired focal plane. In other embodiments, the multipath optic may contribute no optical power: the position of the virtual display image may be determined instead by the converging power of lens 40. In one embodiment, the focal length of lens 40 may be adjustable, so that the focal plane of the display image can be moved back and forth in the wearer's field of view. In FIG. 4, an apparent position of virtual display image 32 is shown, by example, at 42. In other embodiments, the focal length of lens 40 may be fixed, such that the focal plane of the display image is maintained at or near infinity. Nevertheless, the apparent focal plane of the display image can still be moved back and forth by providing stereoscopically related images to the projectors of each eye.

FIG. 4 also shows aspects of eye tracker 22, which includes illuminator 44 and detector 46. The illuminator may include a low-power infrared LED or diode laser. In one embodiment, the illuminator may provide periodic illumination in the form of narrow pulses—e.g., 1 microsecond pulses spaced 50 microseconds apart. The detector may be any camera suitable for imaging the wearer's eye in enough detail to resolve the pupil. More particularly, the resolution of the detector may be sufficient to enable estimation of the position of the pupil with respect to the eye orbit, as well as the extent of closure of the iris. In one embodiment, the aperture of the detector is equipped with a wavelength filter matched to the output wavelength band of the illuminator. Further, the detector may include an electronic 'shutter' synchronized to the pulsed output of the illuminator.

FIG. 4 also shows aspects of dimming filter 18, on which cross-polarizing layer 48 is arranged. The cross-polarizing layer is configured to decrease the transmittance of the see-thru display device to the real imagery viewed by the wearer. In one embodiment, the cross-polarizing layer may include an electrically polarizable liquid crystal; the transmittance may be decreased by increasing a polarization applied to the liquid crystal. It will be noted that dimming filters of alternative configurations are contemplated as well.

These include polymer-dispersed liquid crystal (PDLC) films, guest-host structures, and various electrochromic materials configured for controllable, neutral-density attenuation of real-image brightness.

In still other embodiments, the optical componentry of projector 20 itself may be used to control the balance between real-world and display light that reaches the wearer's eye. In projection, free-form optic, or waveguide-oriented display variants, for example, a cholosteric liquid crystal display (CH-LCD) may be used as an active mirror. This component may be switched on and off to mix the desired amount of display light into the wearer's field of view. An overall CH-LCD approach may include discrete layers for red, green, and blue display light, reflecting such light into the eye when the layer is active, and remaining transparent otherwise. This approach offers an advantage under low-light conditions, in that real imagery can be transmitted through the inactive layers in color-sequential mode. Alternatively, the inactive layers can be turned to block the real imagery, providing controllable dimming of selected colors.

It will be noted that CH-LCD materials are also circularly polarized, which allows oppositely polarized real imagery to transmit through. One can also use CH-LCD materials aligned to both polarization directions to allow non-polarized light to be reflected on two planes, for 2× efficiency. Blocking may also be controlled in both polarization directions, in high-light environments, if desired.

FIG. 4 also shows selected aspects of computer 24. The computer includes various engines distributed between the logic and storage subsystems thereof (vide infra). In particular, the computer includes estimation engine 50, which is operatively coupled to detector 46 of eye trackers 22. The estimation engine is configured to estimate the ocular depth of field of the wearer of see-thru display device 16. The computer also includes blur engine 52, which is operatively coupled to the estimation engine and to projectors 20. The blur engine is configured to apply a specified amount of blur to the virtual imagery projected by the see-thru display device.

In some AR scenarios, virtual imagery from see-thru display device 16 is rendered as true-to-life as possible, so that it blends naturally into the real imagery sighted by the wearer. For instance, the virtual imagery may be rendered in such a way that it appears to be influenced by the natural lighting of the real environment. This may affect the brightness, shadowing, and coloration of the virtual imagery, for example. True-to-life rendering may also include correcting the virtual image for the finite ocular depth of field of the wearer—i.e., making all or part of the virtual image appear out-of-focus to the wearer of the see-thru display device. Absent such correction, the virtual imagery may appear sharper than nearby real imagery, which could emphasize to the wearer that the virtual imagery is not real, and thereby degrade the AR experience.

Figure 5:
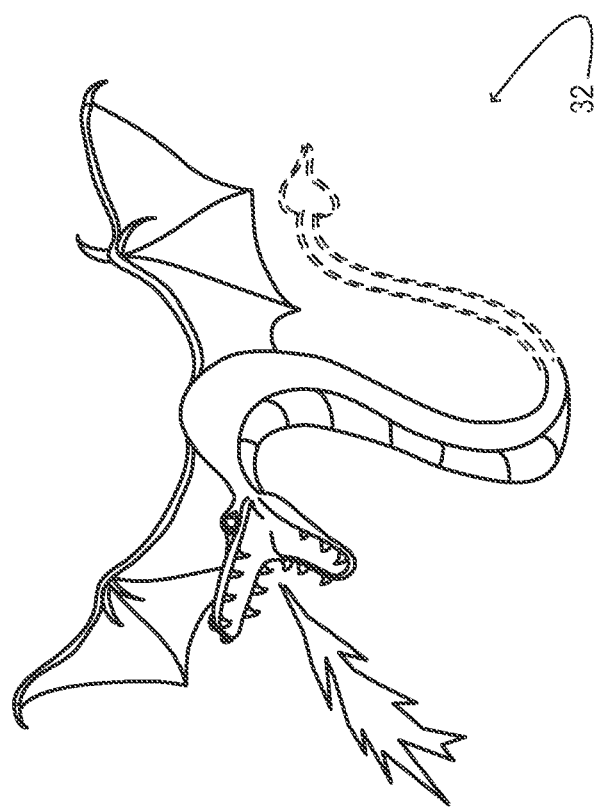
FIG. 5 shows an example virtual image with blurring applied to a part of the image, in accordance with an embodiment of this disclosure.

Computational methods may be used to introduce a specified amount of blur to a specified part of a display image. As shown suggestively in FIG. 5, for example, blur is introduced toward the rear of the dragon. This effect is consistent with the focal plane of the observer being close to the dragon's head, and the observer's depth of field being shallower than the dragon's length. In this view, if the dragon were real then its head would be in focus, but its tail would be out of focus. It is also possible to introduce blurring to two or more unconnected regions of an image. For example, if the observer's focal plane is set to an intermediate distance, very near and very distant on a virtual object could be presented with blurring, consistent with these points lying outside of the observer's depth of field. A blur kernel is a convolution matrix used to impart a specified amount of blur to selected regions of a sharp image.

Selective blurring may be used to establish a virtual depth of field perceived by a wearer of a see-thru display device. The virtual depth of field may be defined as the depth range that brackets the in-focus virtual imagery presented to an observer—e.g., the wearer of a see-thru display device. This concept is analogous to the ocular depth of field, which brackets in-focus real imagery sighted by the observer. To achieve a realistic AR experience through selective blurring of virtual imagery, the focal plane and ocular depth of field of the wearer of the see-thru display device may be determined, as further described hereinafter.

The configurations described above enable various methods for controlling a depth of field of a wearer of a see-thru display device. Accordingly, some such methods are now described, by way of example, with continued reference to the above configurations. It will be understood, however, that the methods here described, and others fully within the scope of this disclosure, may be enabled by other configurations as well. Further, some of the process steps described and/or illustrated herein may, in some embodiments, be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Figure 6:
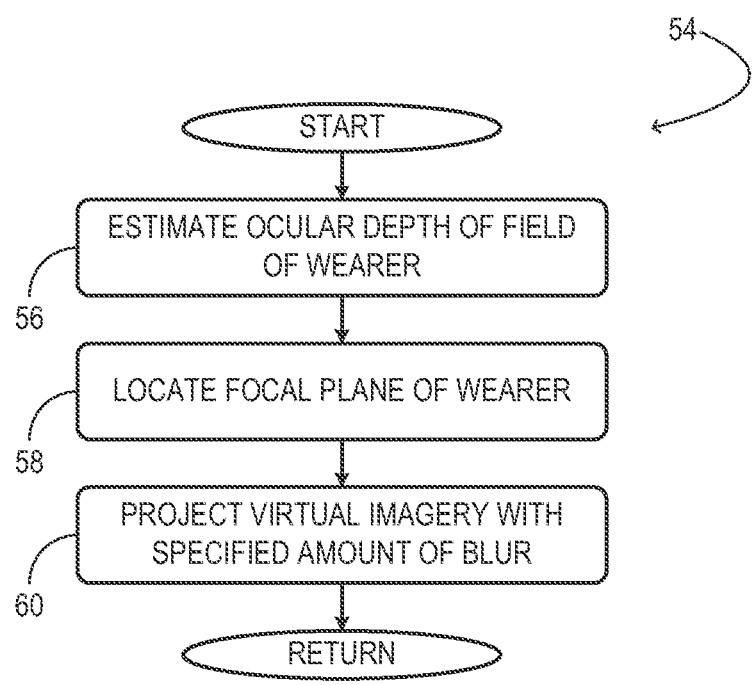
FIG. 6 illustrates an example method for controlling a virtual depth of field perceived by a wearer of a see-thru display device in accordance with an embodiment of this disclosure.

FIG. 6 illustrates an example method 54 for controlling a virtual depth of field perceived by a wearer of a see-thru display device. At 56 of method 54, the ocular depth of field of the wearer is estimated. In one embodiment, the ocular depth of field may be estimated via estimation engine 50 of computer 24. The estimation engine may be configured to estimate the ocular depth of field perceived by the wearer based on a size of the wearer's pupils as imaged by eye trackers 22, for example. In other examples an estimation engine may estimate the ocular depth of field based on other data, such as a signal from an ambient light sensor. As such, eye trackers need not be included in every embodiment of this disclosure.

Continuing in FIG. 6, at 58 the focal plane of the wearer is located via eye trackers 22 in the manner described above. In some embodiments, the focal point of the wearer can be located in addition to the focal plane. At 60 the appropriate virtual imagery is projected onto the wearer's pupils via projectors 20. Projecting the virtual imagery may entail positioning the virtual imagery at a specified depth with respect to the focal plane as located above.

More specifically, virtual imagery having a specified amount of blur may be projected. In one embodiment, the specified amount of blur may be applied via a blur engine of computer 24. The blur engine may be configured to apply a specified amount of blur to the virtual imagery, the specified amount determined as a function of the ocular depth of field, which was estimated at 56.

In one embodiment, a blur kernel may be applied to transform a virtual display image to provide a specified amount of blur in a specified region or regions of the image. In the embodiments here contemplated, the specified amount of blur may range from no blur at all to an extreme amount of blur that completely obscures the affected region or regions of the image. In one embodiment, the amount of blur applied through various depth values in a virtual scene may vary continuously. In other embodiments, the specified amount of blur may be chosen from among two or more discrete values, to simplify computation.

As noted above, the amount of blur applied to the virtual imagery may be determined as a function of the ocular depth of field estimated at 56. In one embodiment, the specified amount of blur may be chosen so that the virtual depth of field matches the ocular depth of field. This approach may be used to make the virtual imagery blend into the real imagery and appear life-like. It will be appreciated, however, that the specified amount of blur may also be chosen to achieve the opposite effect—viz., to cause the virtual depth of field to differ from the ocular depth of field, thereby making the virtual imagery stand out.

No aspect of the method above should be understood in a limiting sense, for numerous variants are contemplated as well. For instance, based on the ocular depth of field estimated at 56, the wearer's hyperfocal distance may be computed. In this embodiment, projecting the virtual imagery may include projecting a plurality of virtual objects positioned closer than the hyperfocal distance by an amount not to exceed the ocular depth of field. This approach may be used when it is desired to pack the maximum number of resolvable virtual objects at different depths within the wearer's depth of field.

Figure 7:
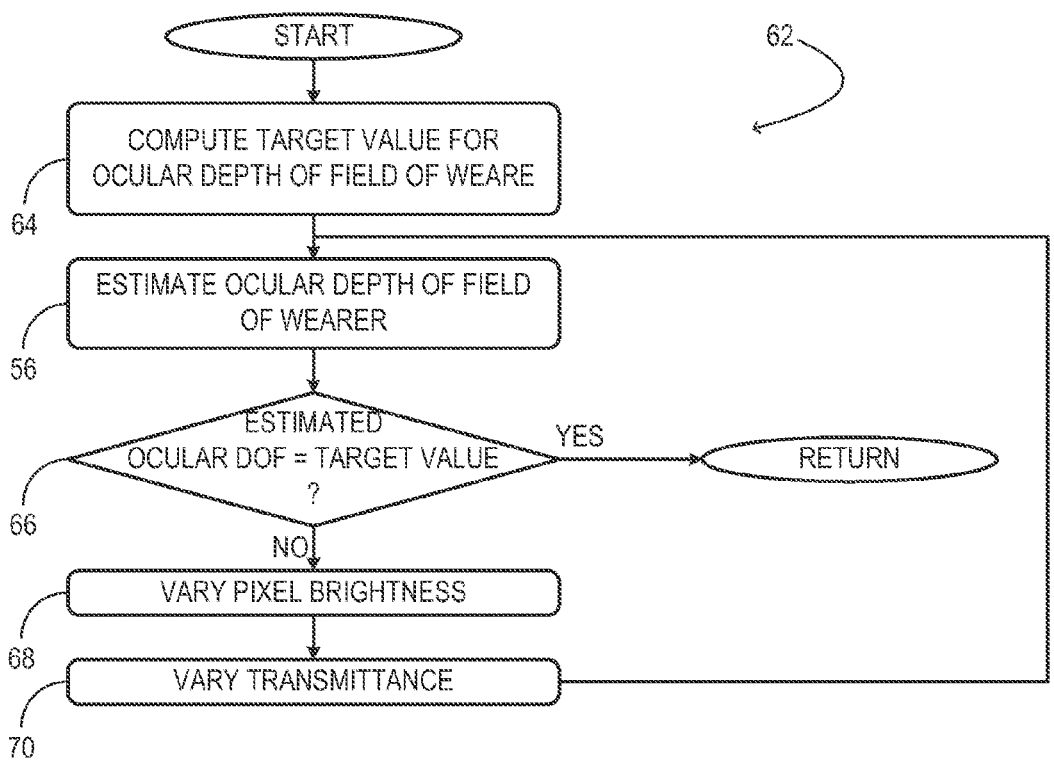
FIG. 7 illustrates an example method for controlling an ocular depth of field of a wearer of a see-thru display device in accordance with an embodiment of this disclosure.

The foregoing method illustrates control of a virtual depth of field based on an estimated ocular depth of field. However, the configurations described above also enable various methods to control the wearer's ocular depth of field through dilation and/or contraction of his or her pupils. This approach enables cinematic depth-of-field control to be applied even to the real-world imagery sighted by the wearer of a see-thru display device. Accordingly, FIG. 7 illustrates an example method 62 for controlling an ocular depth of field of the wearer.

At 64 of method 62 a target value for the ocular depth of field of the wearer is computed. The target value may be a value chosen to yield a desired cinematic effect—to narrow the wearer's focus on a particular object or suddenly bring near or distant objects into focus, for example. At 56 the ocular depth of field of the wearer is estimated, as in the foregoing method. At 66 it is determined whether the estimated ocular depth of field equals the target value. If the estimated ocular depth of field equals the target value, then the method returns. Otherwise, the method advances to 68. At 68 the pixel brightness of the virtual display image presented to the wearer is varied in such a manner as to cause the wearer's ocular depth of field to approach the target value. Naturally, the term 'pixel brightness' may refer to the brightness of some or all pixels of the virtual display image, to the brightness of all illuminated pixels, etc. In particular, one or both projectors of the see-thru display device may be configured to increase the pixel brightness in order to contract the wearer's pupils and thereby deepen the depth of field to the target value. Conversely, a projector may be configured to decrease the pixel brightness in order to dilate the wearer's pupils and thereby contract the depth of field to the target value. In one embodiment, the pixel brightness may be increased by prolonging a duty cycle of a light-emitting diode and/or laser arranged within a projector, and decreased by shortening the duty cycle.

At 70 the transmittance of the see-thru display device to real imagery presented to the wearer is varied. In particular, a dimming filter of the see-thru display device may be configured to decrease the transmittance in order to dilate the wearer's pupils and thereby contract the depth of field to the target value. Conversely, the dimming filter may be configured to increase the transmittance in order to contract the wearer's pupils and thereby deepen the depth of field to the target value. In these and other embodiments, the pixel brightness and the transmittance may be varied subject to appropriate damping to prevent abrupt changes or instability. In one embodiment, the damping may be based on a time constant that reflects the natural response time of the human iris to changing levels of brightness.

In method 54 above and in other methods (including methods unrelated to depth-of-field control), the pixel brightness and the transmittance may be varied each in such direction and by such an amount as to maintain a desired brightness ratio between the real and virtual imagery presented to the wearer. This is possible because the transmittance and the pixel brightness may be varied independently of each other. In particular, the brightness of the virtual imagery—virtual objects, text, etc.—may be adjusted to match that of the real imagery within a suitable brightness interval. The advantages of this approach include a more realistic AR experience and improved readability of virtual text, among others.

In some embodiments, the detailed approach for brightness matching between real and virtual imagery may be based on other factors, such as battery-power availability in see-thru display device 16. When the battery is fully charged, the pixel brightness may be increased more, and the transmittance decreased less, than when the battery charge is low.

In method 54, the steps of estimating the wearer's ocular depth of field and varying pixel brightness and/or transmittance are enacted in a closed-loop manner to bring the estimated depth of field to the target value. It will be understood, however, that open-loop control of the ocular depth of field is also contemplated. In this approach, a suitable model can be applied to quantitatively forecast the effect of pixel brightness and/or transmittance changes on the ocular depth of field.

It will also be understood that the methods illustrated herein may be used separately or together. In some cases, individual aspects of one method may be added to another to achieve an advantage. For instance, method 62 may include the additional step of locating the focal plane and/or focal point of the wearer of the see-thru display device (58 of method 54). Accordingly, in scenarios where the pixel brightness is to be increased in order to contract the wearer's pupils and thereby deepen the ocular depth of field, the brightness may be increased predominately at the focal plane and/or focal point. This approach may be used advantageously to reduce power consumption in the see-thru display device—e.g., under low-battery conditions.

As noted earlier, numerous variants are envisaged for the systems and methods set forth above. One variant is related to the problem of virtual-text readability and image-color trueness. With any see-thru display device, light from the virtual imagery is superposed over light from the real imagery. The light from the real imagery can have two effects on the wearer's perception of the virtual imagery. First, when the virtual imagery is overlaid on a similarly colored real background, there will be a loss of color contrast and therefore readability. Second, when the virtual imagery is overlaid on a differently colored real background, the perceived color will be the sum of the virtual foreground and real background color, thereby degrading color trueness.

However, in the approach presented herein, the color trueness of the virtual imagery and the desired color contrast can be dynamically maintained by the see-thru display device. In particular, the ambient color of the real imagery can be detected, and the virtual display imagery can be modified to obtain the desired effect. This can be achieved by incorporation of an ambient color sensor in the see-thru display device. The projection componentry can be configured to adjust the color and/or brightness of the virtual imagery to compensate for the ambient color and light level. To this end, a color camera matched to the field of view of the wearer may be included in the system; FIG. 4 shows color camera 71, by way of example. The dynamically captured real imagery can be compared to the intended display imagery. Such color comparison may be used to calculate the color of the display imagery that, when superposed on the real imagery, will yield the desired effect—i.e., color trueness or enhanced readability, as desired.

In some embodiments, the methods and processes described above may be tied to a computing system of one or more computing devices. In particular, such methods and processes may be implemented as a computer-application program or service, an application-programming interface (API), a library, and/or other computer-program product.

Figure 8:
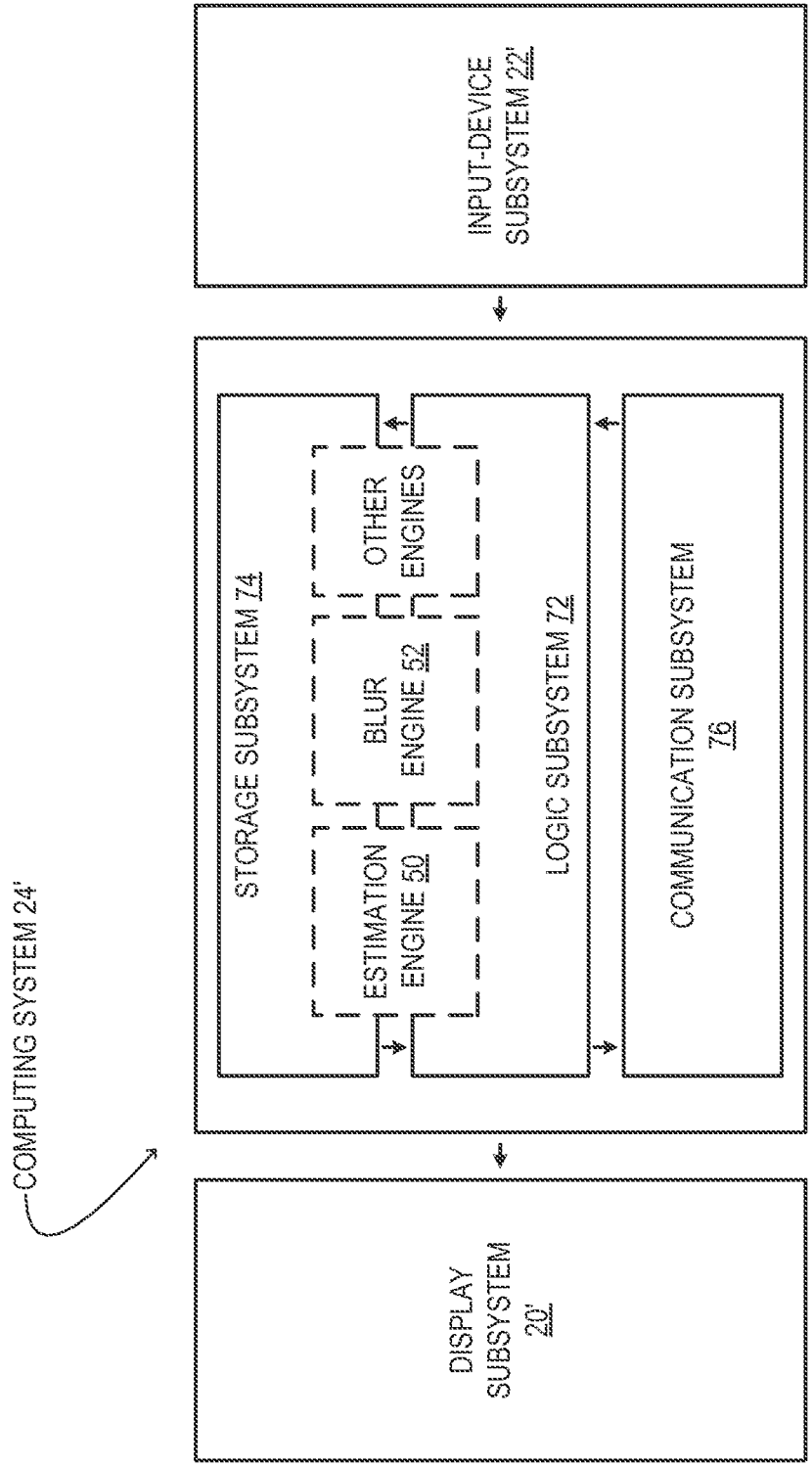
FIG. 8 shows aspects of an example computing system in accordance with an embodiment of this disclosure.

FIG. 8 schematically shows a non-limiting embodiment of a computing system 24' that can perform one or more of the methods and processes described above. Computing system 24' is shown in simplified form. It will be understood that virtually any computer architecture may be used without departing from the scope of this disclosure. In different embodiments, computing system 24' may take the form of a mainframe computer, server computer, desktop computer, laptop computer, tablet computer, home-entertainment computer, network computing device, gaming device, mobile computing device, mobile communication device (e.g., smart phone), etc.

Computing system 24' includes a logic subsystem 72 and a storage subsystem 74. Computing system 24' may optionally include a display subsystem 20', input-device subsystem 22', communication subsystem 76, and/or other components not shown in FIG. 10. Computing system 24' may also optionally include or interface with one or more user-input devices such as a keyboard, mouse, game controller, camera, microphone, and/or touch screen, for example. Such user-input devices may form part of input-device subsystem 22' or may interface with input-device subsystem 22'.

Logic subsystem 72 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem may include one or more processors configured to execute software instructions. Additionally or alternatively, the logic subsystem may include one or more hardware or firmware logic machines configured to execute hardware or firmware instructions. The processors of the logic subsystem may be single-core or multi-core, and the programs executed thereon may be configured for sequential, parallel or distributed processing. The logic subsystem may optionally include individual components that are distributed among two or more devices, which can be remotely located and/or configured for coordinated processing. Aspects of the logic subsystem may be virtualized and executed by remotely accessible networked computing devices configured in a cloud-computing configuration.

Storage subsystem 74 includes one or more physical, non-transitory, devices configured to hold data and/or instructions executable by the logic subsystem to implement the herein-described methods and processes. When such methods and processes are implemented, the state of storage subsystem 74 may be transformed—e.g., to hold different data.

Storage subsystem 74 may include removable media and/or built-in devices. Storage subsystem 74 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others. Storage subsystem 74 may include volatile, nonvolatile, dynamic, static, read/write, read-only, random-access, sequential-access, location-addressable, file-addressable, and/or content-addressable devices. In some embodiments, logic subsystem 72 and storage subsystem 74 may be integrated into one or more unitary devices, such as an application-specific integrated circuit (ASIC), or a system-on-a-chip.

It will be appreciated that storage subsystem 74 includes one or more physical, non-transitory devices. However, in some embodiments, aspects of the instructions described herein may be propagated in a transitory fashion by a pure signal—e.g., an electromagnetic or optical signal, etc.—that is not held by a physical device for a finite duration. Furthermore, data and/or other forms of information pertaining to the present disclosure may be propagated by a pure signal.

The terms "module," "program," and "engine" may be used to describe an aspect of computing system 24' implemented to perform a particular function. In some cases, a module, program, or engine may be instantiated via logic subsystem 72 executing instructions held by storage subsystem 74. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 20' may be used to present a visual representation of data held by storage subsystem 74. This visual representation may take the form of a graphical user interface (GUI). As the herein described methods and processes change the data held by the storage subsystem, and thus transform the state of the storage subsystem, the state of display subsystem 20' may likewise be transformed to visually represent changes in the underlying data. Display subsystem 20' may include one or more display devices utilizing virtually any type of technology. Such display devices may be combined with logic subsystem 72 and/or storage subsystem 74 in a shared enclosure, or such display devices may be peripheral display devices.

When included, communication subsystem 76 may be configured to communicatively couple computing system 24' with one or more other computing devices. Communication subsystem 76 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 24' to send and/or receive messages to and/or from other devices via a network such as the Internet.

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. A method for controlling an ocular depth of field of a wearer of a see-thru display device, the method comprising:
estimating via an estimation engine of the see-thru display device, the ocular depth of field of the wearer, the ocular depth of field bracketing in-focus real imagery viewed by the wearer through the see-thru display device;
computing at runtime a target value for the ocular depth of field, the target value chosen to yield an effect on visual perception by the wearer; and
increasing a pixel brightness of virtual imagery presented to the wearer to contract the wearer's pupils and thereby deepen the ocular depth of field to the target value.

2. The method of claim 1 further comprising decreasing a transmittance of the see-thru display device to real imagery presented to the wearer to dilate the wearer's pupils and thereby contract the ocular depth of field to the target value.

3. The method of claim 2 wherein the pixel brightness is increased and the transmittance decreased by such amounts as to maintain a desired brightness ratio between the real and virtual imagery presented to the wearer, while maintaining the ocular depth of field at the target value.

4. The method of claim 1 further comprising estimating the ocular depth of field, wherein the pixel brightness is increased in a closed-loop manner to bring the estimated ocular depth of field to a desired value.

5. The method of claim 1 further comprising locating a focal plane and/or focal point of the wearer, wherein the pixel brightness is increased predominately at the focal plane and/or focal point to deepen the ocular depth of field with reduced power consumption in the see-thru display device.

6. A method for controlling a virtual depth of field perceived by a wearer of a see-thru display device, the virtual depth of field bracketing in-focus virtual imagery presented to the wearer, the method comprising:
determining at runtime a pupil size of the wearer via a detector;
estimating via an estimation engine of the see-thru display device, an ocular depth of field of the wearer based on the pupil size, the ocular depth of field bracketing in-focus real imagery viewed by the wearer through the see-thru display device, the estimation engine operatively coupled to the detector; and
projecting the virtual imagery with a specified amount of blur determined as a function of the ocular depth of field such that the virtual depth of field differs from the ocular depth of field.

7. The method of claim 6 wherein projecting the virtual imagery includes applying a blur kernel to transform the virtual imagery.

8. The method of claim 6 wherein the specified amount of blur is chosen from among two or more discrete amounts of blur.

9. The method of claim 6 further comprising locating a focal plane of the wearer.

10. The method of claim 9 wherein projecting the virtual imagery includes positioning the virtual imagery at a specified depth with respect to the focal plane as located.

11. The method of claim 6 further comprising computing a hyperfocal distance of the wearer as a function of the ocular depth of field as estimated, wherein projecting the virtual imagery includes projecting a plurality of virtual objects positioned closer than the hyperfocal distance by an amount not to exceed the ocular depth of field.

12. A see-thru display device for presenting real and virtual imagery to a wearer, the device comprising:
a projector configured to increase a pixel brightness of the virtual imagery to contract the wearer's pupils and thereby deepen an ocular depth of field of the wearer, the ocular depth of field bracketing in-focus real imagery viewed by the wearer through the see-thru display device;
an electronically controllable dimming filter configured to decrease a transmittance of the see-thru display device to the real imagery to dilate the wearer's pupils and thereby contract the ocular depth of field;
a camera configured to image the wearer's pupils;
an estimation engine operatively coupled to the camera and configured to estimate the ocular depth of field perceived by the wearer based on a size of the wearer's pupils as imaged by the camera at runtime; and
a blur engine operatively coupled to the estimation engine and to the projector, the blur engine configured to apply a specified amount of blur to the virtual imagery, the specified amount determined as a function of the ocular depth of field such that the virtual depth of field differs from the ocular depth of field.

13. The see-thru display device of claim 12 wherein the projector includes a light-emitting diode and/or laser, and wherein the pixel brightness is increased by prolonging a duty cycle of the light-emitting diode and/or laser.

14. The see-thru display device of claim 12 wherein the filter includes an electrically polarizable liquid crystal, and wherein the transmittance is decreased by increasing a polarization applied to the liquid crystal.

15. The see-thru display device of claim 12 wherein the camera is a component of an eye tracker further configured to determine a position of a pupil of the wearer's eye.

16. The see-thru display device of claim 15 wherein the eye tracker is one of a pair of substantially equivalent eye trackers that together locate a focal plane of the wearer.

17. The see-thru display device of claim 12 wherein the projector is one of a pair of substantially equivalent projectors arranged to present a pair of stereoscopically related virtual images in front of the wearer's eyes.

18. The see-thru display device of claim 12, wherein the see-thru display device is worn on the wearer's head and further comprises wireless communications componentry.

* * * * *